(12) United States Patent
Lim et al.

(10) Patent No.: US 11,620,057 B2
(45) Date of Patent: Apr. 4, 2023

(54) STORAGE DEVICE AND OPERATING METHOD THEREOF

(71) Applicant: Samsung Electronics Co., Ltd., Suwon-si (KR)

(72) Inventors: Sangwoo Lim, Yongin-si (KR); Seongnam Kwon, Bucheon-si (KR); Haeri Lee, Suwon-si (KR); Donghwan Jeong, Hwaseong-si (KR); Unseon Cho, Hwaseong-si (KR); Moonsung Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/357,151

(22) Filed: Jun. 24, 2021

(65) Prior Publication Data
US 2022/0155973 A1 May 19, 2022

(30) Foreign Application Priority Data
Nov. 16, 2020 (KR) .................. 10-2020-0153095

(51) Int. Cl.
*G06F 3/06* (2006.01)
*G06F 1/30* (2006.01)

(52) U.S. Cl.
CPC .............. *G06F 3/0619* (2013.01); *G06F 1/30* (2013.01); *G06F 3/0653* (2013.01);
(Continued)

(58) Field of Classification Search
CPC .... G06F 3/0619; G06F 3/0653; G06F 3/0656; G06F 3/0659; G06F 3/0679; G06D 1/30
See application file for complete search history.

(56) References Cited

U.S. PATENT DOCUMENTS

| 8,392,655 B2 | 3/2013 | Olsen et al. |
| 8,836,285 B2 | 9/2014 | Yamada et al. |

(Continued)

FOREIGN PATENT DOCUMENTS

| CN | 105894396 A | 8/2016 |
| KR | 101313979 B1 | 10/2013 |

(Continued)

OTHER PUBLICATIONS

Gupta, A. et al. "DFTL: A Flash Translation Layer Employing Demand-based Selective Caching of Page-Level Address Mappings." *ACM SIGPLAN Notices*, vol. 44, No. 3 (2009): pp. 229-240.

(Continued)

*Primary Examiner* — Edward J Dudek, Jr.
(74) *Attorney, Agent, or Firm* — Harness, Dickey & Pierce, P.L.C.

(57) ABSTRACT

A storage device includes: a nonvolatile memory including power loss protector (PLP) memory blocks configured to store at least one of meta data or user data for data backup; a buffer memory configured to store at least one of the meta data or the user data stored in the PLP memory blocks; a charging circuit configured to generate electric power for data backup in response to a sudden power off (SPO) occurrence, and transmit a first charging complete signal or a second charging complete signal to a processor according to a level of the electric power, and; and the processor configured to control at least one of the nonvolatile memory and the buffer memory to execute a first request from a host related to the meta data with priority in response to the first charging complete signal, and execute a second request from the host related to the meta data or the user data in response to the second charging complete signal.

20 Claims, 14 Drawing Sheets

(52) U.S. Cl.
CPC .......... *G06F 3/0656* (2013.01); *G06F 3/0659* (2013.01); *G06F 3/0679* (2013.01)

(56) References Cited

U.S. PATENT DOCUMENTS

| | | | |
|---|---|---|---|
| 9,123,409 B2 | 9/2015 | Eilert et al. | |
| 9,977,735 B2 | 5/2018 | Lee et al. | |
| 10,795,823 B2 | 10/2020 | Ramanujan et al. | |
| 2010/0097034 A1 | 4/2010 | Shu et al. | |
| 2012/0221801 A1* | 8/2012 | Okawa | G06F 1/3212 |
| | | | 711/154 |
| 2012/0246398 A1* | 9/2012 | Hosaka | G06F 11/1441 |
| | | | 711/E12.008 |
| 2013/0076299 A1 | 3/2013 | Chao | |
| 2014/0015323 A1 | 1/2014 | Matthews | |
| 2015/0019514 A1 | 1/2015 | Forster et al. | |
| 2016/0259589 A1* | 9/2016 | Zettsu | G06F 12/0868 |
| 2017/0060436 A1* | 3/2017 | Trika | G06F 3/0656 |
| 2017/0168890 A1* | 6/2017 | Marripudi | G06F 3/0619 |
| 2017/0228154 A1* | 8/2017 | Liu | G06F 11/1441 |
| 2017/0262375 A1* | 9/2017 | Jenne | G06F 12/0895 |
| 2019/0155733 A1 | 5/2019 | Hagersten | |
| 2021/0116984 A1* | 4/2021 | Chen | G06F 1/3296 |
| 2021/0191864 A1* | 6/2021 | Cho | G06F 12/0804 |

FOREIGN PATENT DOCUMENTS

| | | |
|---|---|---|
| KR | 101557624 B1 | 10/2015 |
| KR | 10-2016-0097657 A | 8/2016 |
| KR | 101915073 B1 | 11/2018 |
| KR | 10-2019-0058317 A | 5/2019 |

OTHER PUBLICATIONS

Yim, K.S. "A Novel Memory Hierarchy for Flash Memory Based Storage Systems." *Journal of Semiconductor Technology and Science*, vol. 5, No. 4 (2005): pp. 262-269.

NVM Express™ Base Specification. NVM Express™ Revision 1.4 (Jun. 10, 2019): pp. 1-403.

* cited by examiner

STORAGE DEVICE AND OPERATING METHOD THEREOF

CROSS-REFERENCE TO RELATED APPLICATIONS

This application is based on and claims priority under 35 U.S.C. § his application is based on and No. 10-2020-0153095, filed on Nov. 16, 2020, in the Korean Intellectual Property Office, the disclosure of which is incorporated by reference herein in its entirety.

BACKGROUND

The inventive concepts relate to a storage device and an operating method of the storage device, and more particularly, to a storage device for efficiently storing and restoring data when sudden power-off (SPO) occurs and an operating method of the storage device.

A storage system may include a storage device and a nonvolatile memory, and may use a buffer memory as a cache memory to reduce a difference in speed to access a storage layer and a memory layer. The buffer memory used as the cache memory may be a volatile memory.

When abnormal SPO occurs, power supply is cut off and data stored in the buffer memory is lost, which may cause a problem in which data integrity is violated when the power is applied again. The storage system may include a backup circuit in preparation for such a situation. When SPO occurs, the backup circuit supplies auxiliary electric power and stores temporary data working on the buffer memory in the nonvolatile memory, thereby protecting data.

SUMMARY

The inventive concepts provide a storage device for reducing or preventing data loss and ensuring, or increasing, data integrity by storing and recovering data according to a storage data layer when sudden power-off (SPO) occurs, and an operating method of the storage device.

According to the inventive concepts, a storage device may include: a nonvolatile memory including power loss protector (PLP) memory blocks configured to store at least one of meta data or user data for data backup; a buffer memory configured to store at least one of the meta data or the user data stored in the PLP memory blocks; a charging circuit configured to, generate electric power for data backup in response to a sudden power off (SPO) occurrence, and generate a first charging complete signal or a second charging complete signal according to a level of the electric power; and a processor configured to control at least one of the nonvolatile memory or the buffer memory to execute a first request from a host related to the meta data with priority in response to the first charging complete signal, and execute a second request from the host related to the meta data or the user data in response to the second charging complete signal.

According to the inventive concepts, a storage device may include a nonvolatile memory including a first PLP memory block corresponding to an Nth power cycle and a second PLP memory block corresponding to a (N+1)th power cycle, and an operating method of the storage device may include: when power is applied to the storage device, reading memory block from the first PLP memory block in response to a first charging complete signal; storing the meta data in a first buffer memory of the storage device; reading user data from the first PLP memory block in response to a second charging complete signal; and storing the user data in a second buffer memory of the storage device, wherein N may be an integer greater than or equal to 0.

According to the inventive concepts, a storage device may include a nonvolatile memory including a first PLP memory block corresponding to an Nth power cycle and a second PLP memory block corresponding to a (N+1)th power cycle, and an operating method of the storage device may include: storing meta data stored in the first PLP memory block in a first buffer memory of the storage device in response to power being applied to the storage device; storing user data stored in the first PLP memory block in a second buffer memory of the storage device in response to power being applied to the storage device; and writing the meta data and the user data to the second PLP memory block in response to a sudden power off (SPO) occurrence, wherein N may be an integer greater than or equal to 0.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments of the present invention will be described in detail with reference to the accompanying drawings.

Figure 1:
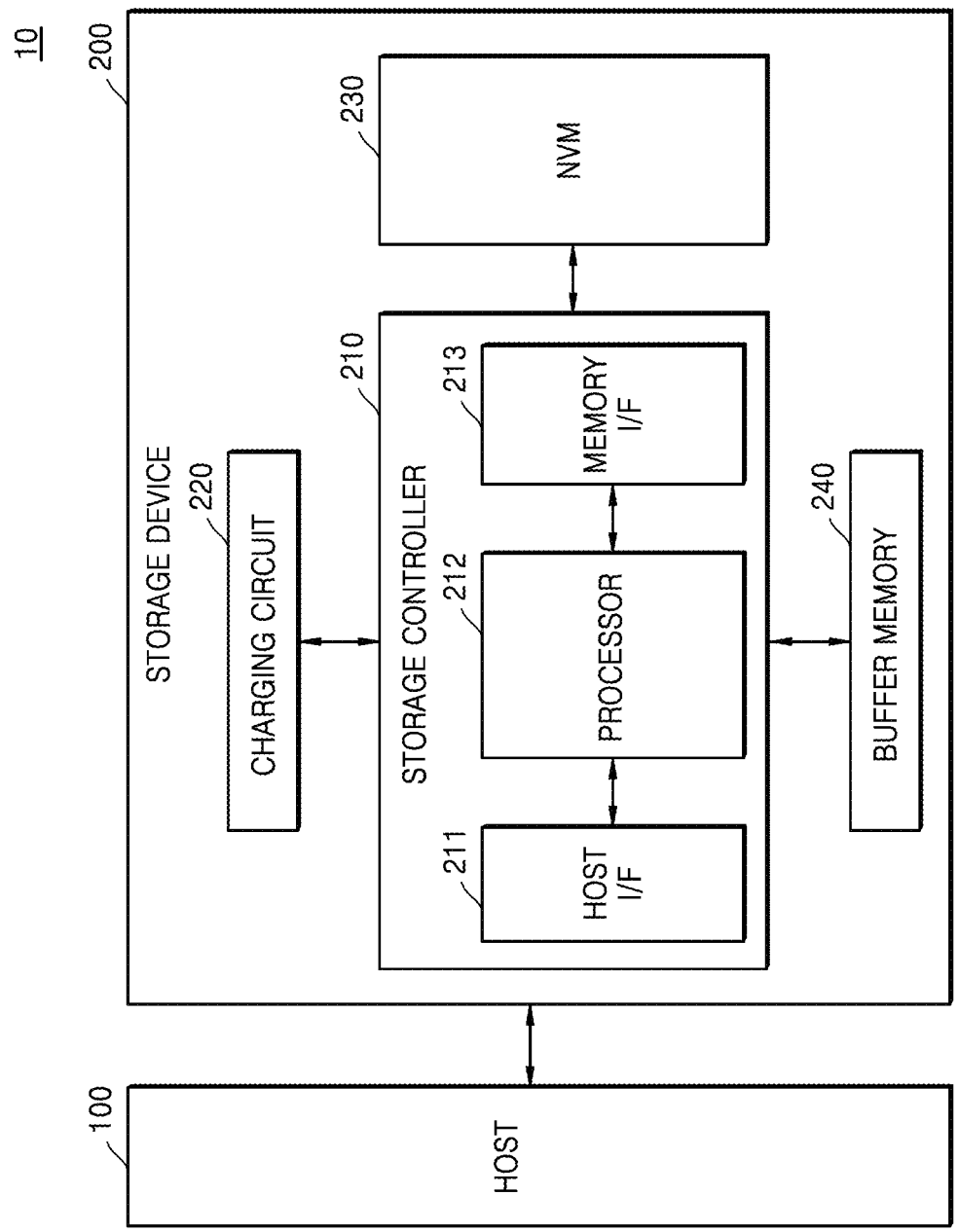
FIG. 1 is a block diagram of a storage system according to an example embodiment of the inventive concepts.

FIG. 1 is a block diagram of a storage system according to an example embodiment of the inventive concepts.

Referring to FIG. 1, a storage system 10 may include a host 100 and/or a storage device 200. The storage system 10 may be implemented as, for example, a personal computer (PC), a data server, a network-combined storage, an Internet-of-Things (IoT) device, a portable electronic device, etc. The portable electronic device may be, for example, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc.

According to an example embodiment of the inventive concepts, the storage device 200 may include a storage controller 210, a charging circuit 220, a nonvolatile memory (NVM) 230, and/or a buffer memory 240.

The storage controller 210 may include a host interface 211, a processor 212, and/or a memory interface 213. The host interface 211 provides a physical connection between the host 100 and the storage controller 210. For example, the host interface 211 may include various interface methods such as advanced technology attachment (ATA), serial ATA (SATA), external SATA (e-SATA), small computer system interface (SCSI), serial attached SCSI (SAS), peripheral component interconnect (PCI), PCI express (PCIe), IEEE 1394, universal serial bus (USB), a secure digital (SD) card, a multi-media card (MMC), an embedded multi-media card (eMMC), and/or a compact flash (CF) card, etc.

According to an example embodiment of the inventive concepts, the host interface 211 may transmit and receive a packet to and from the host 100. A packet transmitted from the host 100 to the host interface 211 may include a command and/or data to be programmed to the NVM 230, and a packet transmitted from the host interface 211 to the host 100 may include a response to the command and/or data read from the NVM 230.

The processor 212 may include a central processing unit, a microprocessor, etc. and may control the overall operation of the storage controller 210. In an example embodiment, the processor 212 may be implemented as a multi-core processor, for example, a dual-core processor or a quad-core processor.

The memory interface 213 provides a physical connection between the storage controller 210 and the NVM 230. For example, a command, an address, and/or data may be transmitted and received between the storage controller 210 and the NVM 230 through the memory interface 213. The memory interface 213 may be implemented to comply with a standard protocol like Toggle, and/or open NAND flash interface (ONFI), etc.

The storage device 200 may further include SPO detection circuit (not shown) connected to the storage controller 210. The SPO detection circuit (not shown) may detect the level of power supply voltage applied to the storage device 200 and transmit a control signal to the storage controller 210 when the level of power supply voltage is below a predetermined (or alternately given) threshold voltage. The storage controller 210 may detect the occurrence of SPO by receiving the control signal.

The storage device 200 may include the charging circuit 220 that generates electric power for data backup when sudden power-off (SPO) occurs. According to an example embodiment of the inventive concepts, the charging circuit 220 may supply electric power to the storage controller 210, the NVM 230, and/or the buffer memory 240 when SPO occurs, and the supplied electric power may be used to write data temporarily stored in the buffer memory 240 to the NVM 230. Also, the charging circuit 220 may transmit a charging complete signal to the storage controller 210 according to the level of generated electric power. The charging circuit 220 will be described in detail with reference to FIGS. 5 and 6.

Although not shown in FIG. 1, the NVM 230 may include a memory cell array, and the memory cell array may include a plurality of memory blocks. The NVM 230 may include NAND flash memory, vertical NAND (VNAND) flash memory, NOR flash memory, resistive random access memory (RRAM), phase-change random access memory (PRAM), magnetoresistive random access memory (MRAM), ferroelectric random access memory (FRAM), spin transfer torque random access memory (STT-RAM), and/or combinations thereof.

According to an example embodiment of the inventive concepts, the NVM 230 may include power loss protector (PLP) memory blocks that store important meta data and user data of a host device for data backup when SPO occurs. When SPO occurs, meta data and user data temporarily stored in the buffer memory 240 are written to the PLP memory block, and when the power is normalized again, data may be read from the PLP memory block and restored in the buffer memory 240. The PLP memory block may be also referred to as, for example, an SPO restoration memory block or the like. The PLP memory block will be described in detail with reference to FIG. 2.

The buffer memory 240 may temporarily store data requested to be written from the host 100 and data read from the NVM 230. The buffer memory 240 may be used as a cache memory to reduce a difference in speed to access a storage layer and a memory layer. The buffer memory 240 may be implemented as a volatile memory, for example, at least one of dynamic random access memory (DRAM), static random access memory (SRAM), and/or phase change random access memory PRAM.

Figure 2:
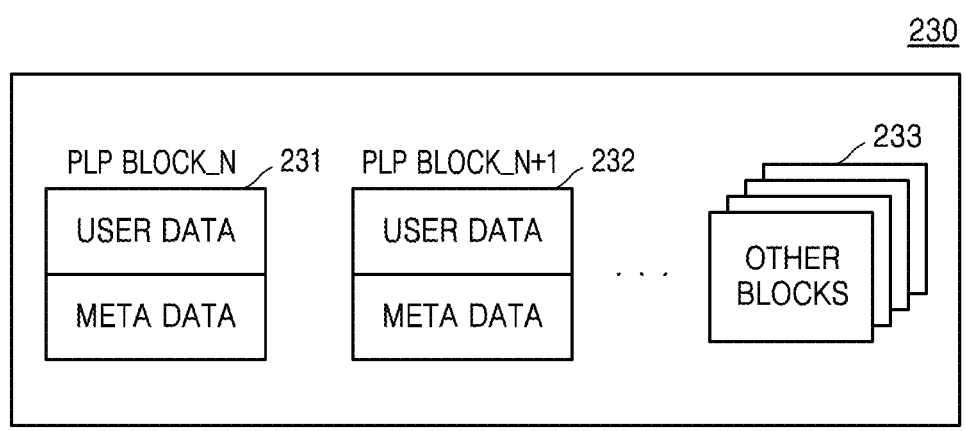
FIG. 2 illustrates an example of a memory block of a nonvolatile memory of FIG. 1.

FIG. 2 illustrates an example of a memory block of the NVM 230 of FIG. 1. Referring to FIGS. 1 and 2 together, according to an example embodiment of the inventive concepts, the processor 212 may allocate the PLP memory blocks. The processor may allocate the first PLP memory block 231 and the second PLP memory block 232. The processor may identify the first PLP memory block 231 and the second PLP memory block 232 based on the memory address allocated to each PLP memory block. For example, the processor 212 may allocate the first PLP memory block 231 to the first memory address. The processor 212 may allocate the second PLP memory block 232 to the second memory address.

The NVM 230 may include a first PLP memory block 231 corresponding to an Nth power cycle, a second PLP memory block 232 corresponding to a (N+1)th power cycle, and/or other memory blocks 233. In this case, N may be an integer greater than or equal to 0.

A power cycle in which power is applied to the storage device 200 and then lost may correspond to the Nth power cycle. When the power is applied to the storage device 200, the storage controller 210 may control the NVM 230 and/or the buffer memory 240 to read data stored in the first PLP memory block 231 corresponding to the Nth power cycle and restore the data stored in the first PLP memory block 231 into the buffer memory 240. Then, the storage controller 210 may provide the restored data to the buffer memory 240 or change the data restored into the buffer memory 240, according to a request from the host 100. In an example embodiment, the request from the host 100 may be a read command for data stored in the buffer memory 240 or a write command to write new data to the buffer memory 240.

When abnormal SPO occurs in the storage device 200, a power cycle after the SPO may correspond to the (N+1)th power cycle. The storage controller 210 may control the NVM 230 and the buffer memory 240 to write data temporarily stored in the buffer memory 240 to the NVM 230. When SPO occurs, the data temporarily stored in the buffer memory 240 may be written to the second PLP memory block 232 corresponding to the (N+1)th power cycle, and after the power is normalized, may be read from the second PLP memory block 232 and restored into the buffer memory 240.

According to an example embodiment of the inventive concepts, the first PLP memory block 231 and/or the second PLP memory block 232 may layer and/or store data. For example, the first PLP memory block 231 may store user data in a first layer and meta data in a second layer. The second PLP memory block 232 may store user data in the first layer and meta data in the second layer. As another example, the first PLP memory block 231 and/or the second PLP memory block 232 may store meta data in the first layer and user data in the second layer.

According to an example embodiment of the inventive concepts, the meta data may indicate data for managing user data, or data generated by a memory system for managing a memory device. For example, the meta data may include at least one of mapping information used to convert a logical address into a physical address in a memory device, physical block information indicating information of memory pages included in physical blocks of a memory device, and various pieces of information for managing a memory space of other memory devices. In an example embodiment, the meta data may be a concept including meta data about meta data. According to an example embodiment of the inventive concepts, the user data may indicate all, or one or more, pieces of data generated and/or owned by a user.

Figure 3:
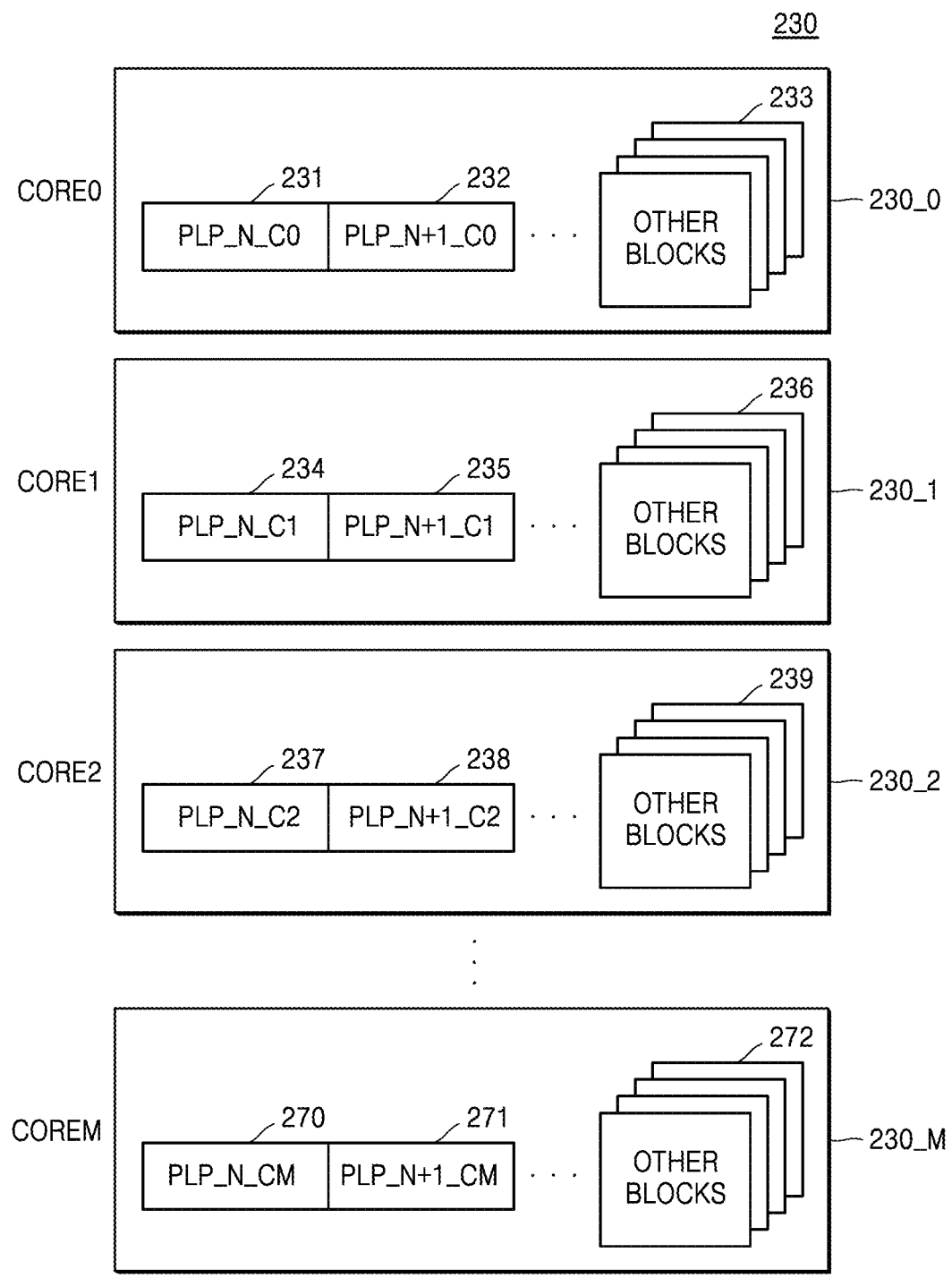
FIG. 3 is a block diagram of a memory block of a nonvolatile memory in a case where a processor is a multi-core processor in FIG. 1.

FIG. 3 is a block diagram of a memory block of an NVM 230 in a case where a processor 212 is a multi-core processor in FIG. 1.

Referring to FIGS. 1 and 3, the processor 212 of FIG. 1 may be a multi-core processor including M cores. In the multi-core processor, at least two PLP memory blocks may be allocated to the same core. For example, a n_0 corresponding a zeroth core CORE0 may include the first PLP memory block 231 corresponding to the Nth power cycle and the second PLP memory block 232 corresponding to the (N+1)th power cycle. FIG. 3 illustrates two PLP memory blocks, but example embodiments are not limited thereto.

The first PLP memory block 231 corresponding to the Nth power cycle and the second PLP memory block 232 corresponding to the (N+1)th power cycle may be alternately used. For example, while power is applied to the storage device 200 and then maintained, the first PLP memory block 231 may be used, and after SPO occurs, the second PLP memory block 232 may be used.

In the multi-core processor, the NVM 230 may include a first PLP memory block and/or a second PLP memory block for each, or one or more, core. For example, an NVM 230_1 corresponding to a first core CORE1 may include a first PLP memory block 234 corresponding to an Nth power cycle and/or a second PLP memory block 235 corresponding to a (N+1)th power cycle. An NVM 230_2 corresponding to a second core CORE2 may include a first PLP memory block 237 corresponding to an Nth power cycle and/or a second PLP memory block 238 corresponding to a (N+1)th power cycle. An NVM 230_M corresponding an Mth core COREM may include a first PLP memory block 270 corresponding to an Nth power cycle and/or a second PLP memory block 271 corresponding to a (N+1)th power cycle.

Figure 4:
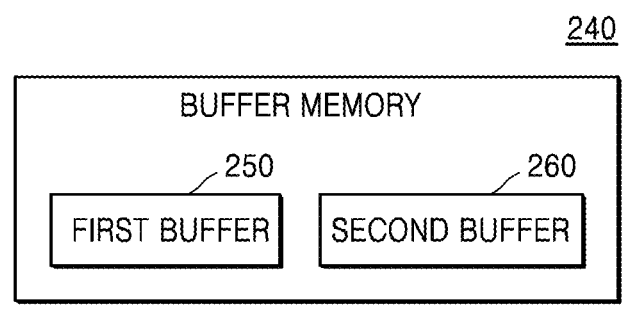
FIG. 4 is a block diagram of a buffer memory according to an example embodiment of the inventive concepts.

FIG. 4 is a block diagram of a buffer memory 240 according to an example embodiment of the inventive concepts.

Referring to FIG. 4, the buffer memory 240 may be partitioned to include a first buffer memory 250 and/or a second buffer memory 260 in one buffer memory. In an example embodiment, the first buffer memory 250 may store meta data, and the second buffer memory 260 may store user data. As another example, the first buffer memory 250 may store user data, and the second buffer memory 260 may store meta data.

Figure 5:
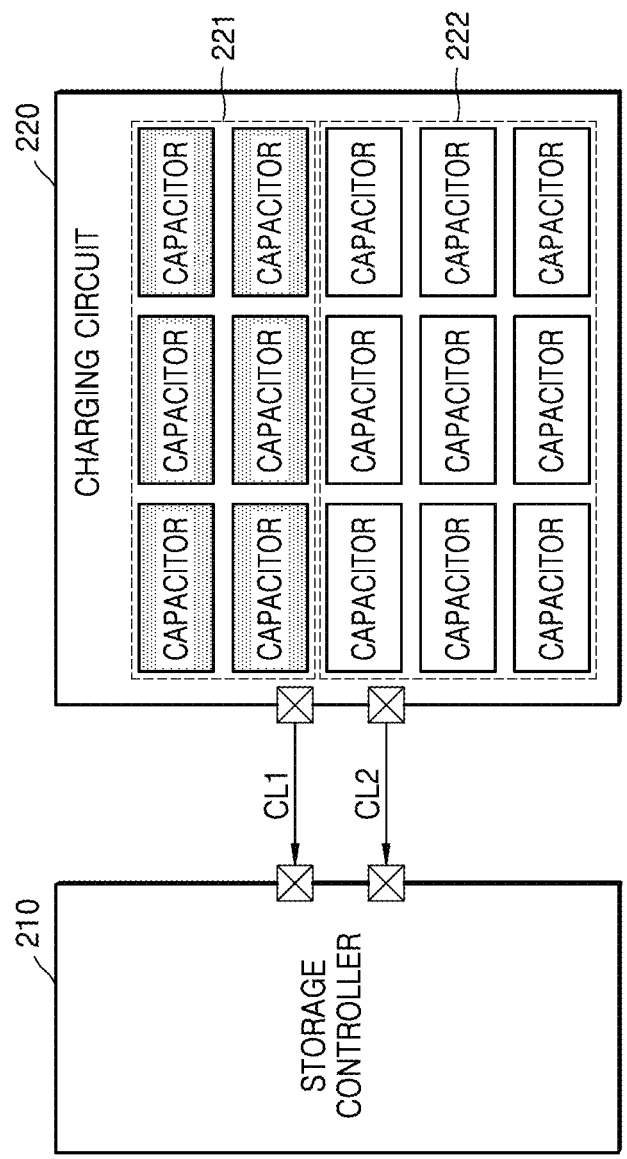
FIG. 5 is a block diagram of a charging circuit according to an example embodiment of the inventive concepts.

FIG. 5 is a block diagram of a charging circuit 220 according to an example embodiment of the inventive concepts.

Referring to FIGS. 1 and 5, the storage device 200 may include the charging circuit 220 that generates electric power for data backup when SPO occurs. When SPO occurs, the charging circuit 220 may supply electric power to the storage controller 210, the NVM 230, and/or the buffer memory 240.

According to an example embodiment of the inventive concepts, the charging circuit 220 may include capacitors that generate electric power for data backup, and the electric power generated by the charging circuit 220 may be used to write data temporarily stored in the buffer memory 240 to the NVM 230.

In an example embodiment, the charging circuit 220 may be physically partitioned into a first region 221 and a second region 222. The first region 221 may generate electric power required, or sufficient, to write meta data temporarily stored in the first buffer memory 250 to a PLP memory block corresponding to a power cycle after SPO. The second region 222 may generate electric power required, or sufficient, to write user data temporarily stored in the second buffer memory 260 to a PLP memory block corresponding to a power cycle after SPO. FIG. 5 illustrates that the first region 221 includes six capacitors and the second region 222 includes nine capacitors, but example embodiments are not limited thereto.

The charging circuit 220 may transmit a first charging complete signal CL1 and/or a second charging complete signal CL2 to the storage controller 210 according to the level of generated electric power. When the capacitors included in the first region 221 are completely (or substantially) charged, the charging circuit 220 may transmit the first charging complete signal CL1 to the storage controller 210. When the capacitors included in the first region 221 and the second region 222 are completely (or substantially) charged, the charging circuit 220 may transmit the second charging complete signal CL2 to the storage controller 210.

It has been described with reference to FIG. 5 that the first charging complete signal CL1 and the second charging complete signal CL2 are generated by the charging circuit 220. However, according to some example embodiments, the processor 212 in the storage controller 210 may monitor whether the capacitors included in the first region 221 and the second region 222 of the charging circuit 220 are completely (or substantially) charged and may generate the first charging complete signal CL1 and the second charging complete signal CL2.

Figure 6:
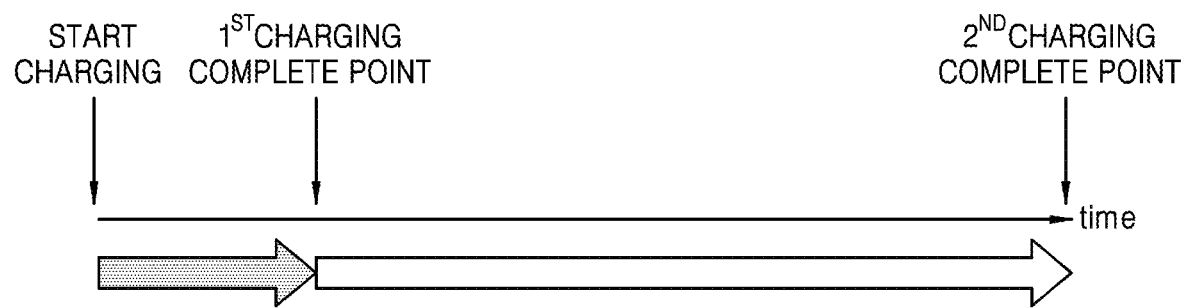
FIG. 6 illustrates an example operating method of a charging circuit according to an example embodiment of the inventive concepts.

FIG. 6 illustrates an example operating method of a charging circuit 220 according to an example embodiment of the inventive concepts.

Referring to FIGS. 5 and 6, the charging circuit 220 may recognize a charging capacity and output the first charging complete signal CL1 and/or the second charging complete signal CL2 to the storage controller 210. When electric power generated by the charging circuit 220 over time is at a first level or higher, the charging circuit 220 may transmit the first charging complete signal CL1 to the storage controller 210. For example, in FIG. 6, the first charging complete signal CL1 may be transmitted to the storage controller 210 at a first charging complete point.

When the electric power generated by the charging circuit 220 is at a second level or higher, the second level being higher than the first level, the charging circuit 220 may transmit the second charging complete signal CL2 to the storage controller 210. For example, in FIG. 6, the second charging complete signal CL2 may be transmitted to the storage controller 210 at a second charging complete point.

It has been described with reference to FIG. 6 that the first charging complete signal CL1 and/or the second charging complete signal CL2 are generated by the charging circuit 220. However, according to some example embodiments, the processor 212 in the storage controller 210 may recognize a charging capacity of the charging circuit 220 over time and may generate the first charging complete signal CL1 and/or the second charging complete signal CL2.

Figure 7:
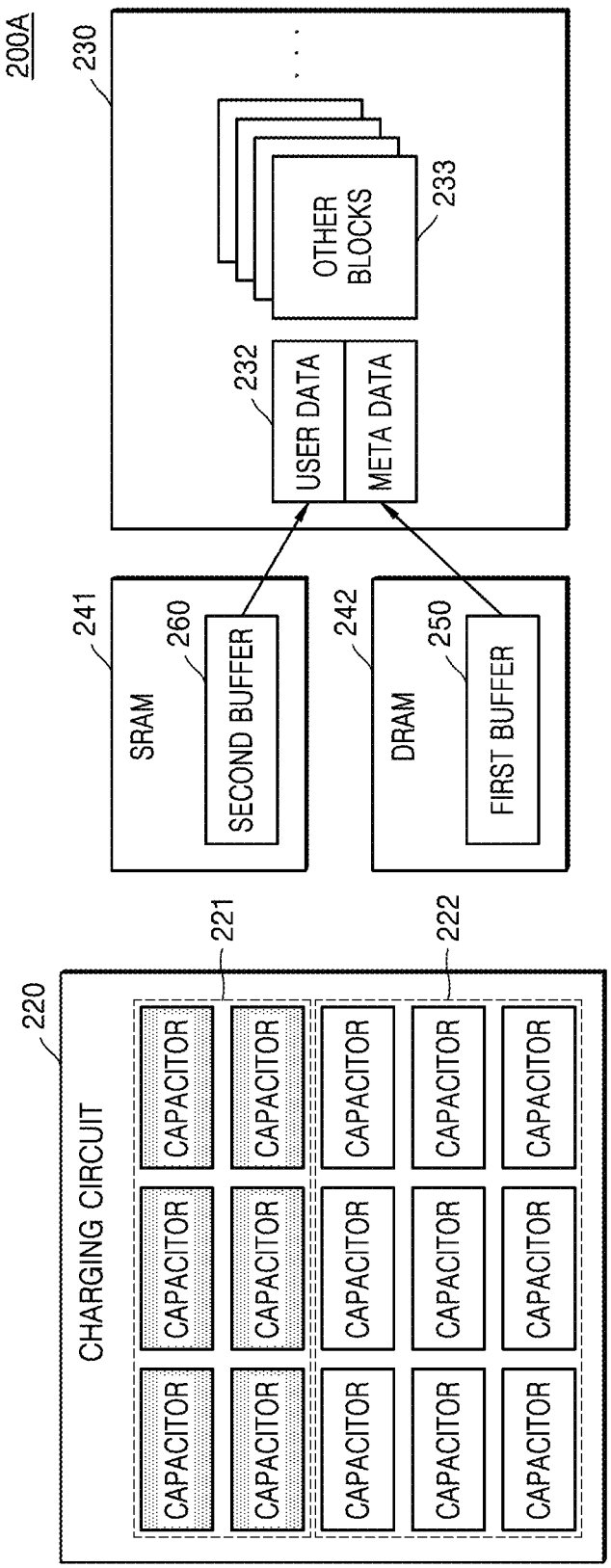
FIG. 7 is a block diagram of an example implementation of a storage device of FIG. 1.

FIG. 7 is a block diagram of a storage device 200A as an example implementation of the storage device 200 of FIG. 1.

Referring to FIG. 7, the storage device 200A may include the charging circuit 220, the NVM 230, SRAM 241, and/or DRAM 242. The SRAM 241 and/or the DRAM 242 may correspond to the buffer memory 240 of FIG. 1. For example, the first buffer memory 250 may be included in the DRAM 242, and/or the second buffer memory 260 may be included in the SRAM 241.

For example, the charging circuit 220 may be charged by being partitioned into the first region 221 and/or the second region 222. When the capacitors included in the first region 221 are completely (or substantially) charged, the electric power generated by the charging circuit 220 may be used to store meta data stored in the first buffer memory 250 of the DRAM 242 in the second PLP memory block 232. When capacitors included in the second region 222 are completely (or substantially) charged, the electric power generated by the charging circuit 220 may be used to store user data stored in the second buffer memory 260 in the second PLP memory block 232.

Figure 8:
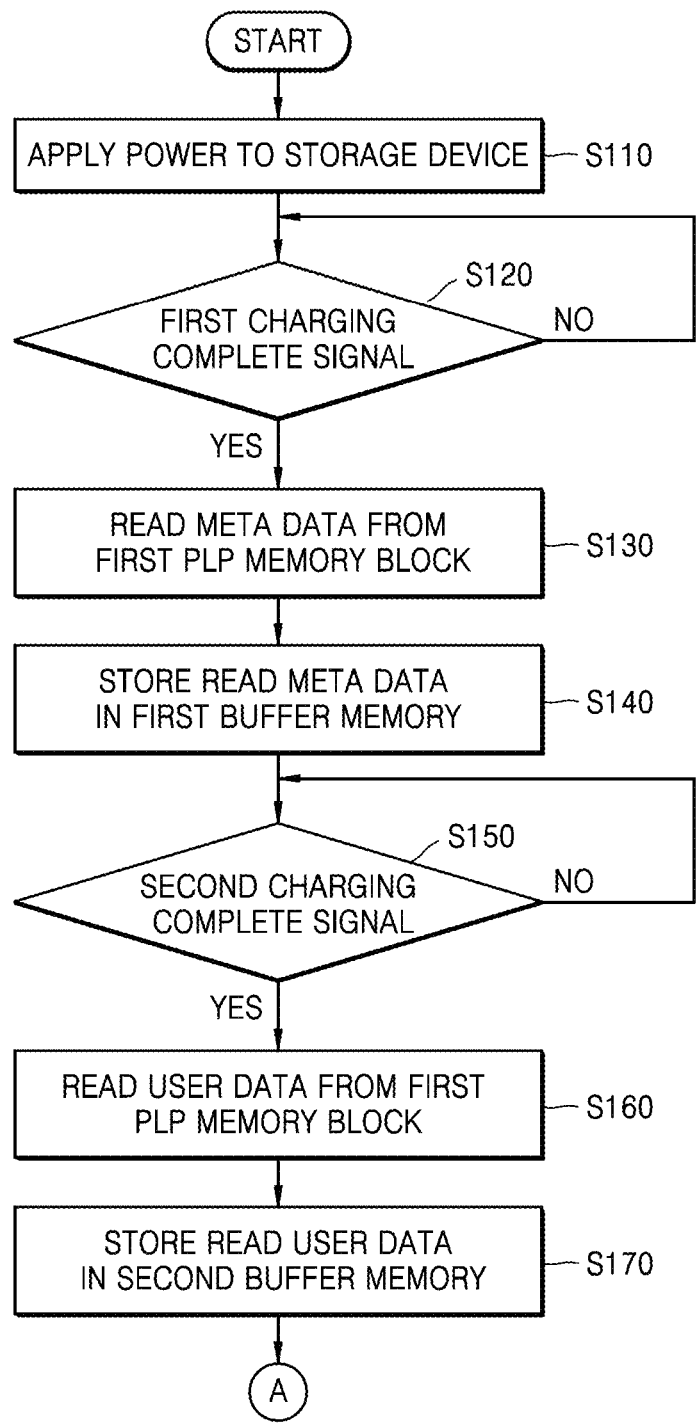
FIG. 8 is a flowchart of an operating method of a storage device in a case where power is applied to a storage device.

FIG. 8 is a flowchart of an operating method of a storage device 200 in a case where power is applied to a storage device 200.

When power is applied to a storage device 200 (operation S110), a storage controller 210 may layer and store data in a buffer memory 240 according to stepwise charging of a charging circuit 220 and may execute a request from a host 100.

Referring to FIG. 8, the power is applied to the storage device 200 (operation S110), and the storage controller 210 may receive a first charging complete signal CL1 from the charging circuit 220 (operation S120-Y). In an example embodiment, when electric power generated by the charging circuit 220 is at a first level or higher, the storage controller 210 may receive a first charging complete signal CL1 from the charging circuit 220 and may read meta data from a first PLP memory block 231 in response to the first charging complete signal CL1 (operation S130). The storage controller 210 may store the read meta data in a first buffer memory 250 (operation S140). When the first charging complete signal CL1 is not received from the charging circuit 220 (operation S120-N), the storage controller 210 may wait until first charging is completed.

The storage device 200 restores meta data into the first buffer memory 250 in response to the first charging complete signal CL1, and thus is switched to a state in which a request from the host 100 related to the meta data may be executed with priority.

After the first charging complete signal CL1 is received from the charging circuit 220 (operation S120), the storage controller 210 may receive a second charging complete signal CL2 (operation S150-Y). In an example embodiment, when the electric power generated by the charging circuit 220 is at a second level or higher, the storage controller 210 may receive the second charging complete signal CL2 from the charging circuit 220. The storage controller 210 may read user data from the first PLP memory block 231 in response to the second charging complete signal CL2 (operation S160). The storage controller 210 may store the read user data in a second buffer memory 260 (operation S170). When the second charging complete signal CL2 is not received from the charging circuit 220 (operation S150-N), the storage controller 210 may wait until second charging is completed.

The storage device 200 restores the user data into the second buffer memory 260 in response to the second charging complete signal CL2, and thus is switched to a state in which all, or one or more, requests from the host 100 related to the meta data or the user data may be executed.

Therefore, according to an example embodiment of the inventive concepts, the storage device 200 may layer storage data into meta data and user data, and first respond to a request related to the meta data that the host 100 requires, or requests, first, thereby improving the overall response speed of the storage device 200.

Figure 9:
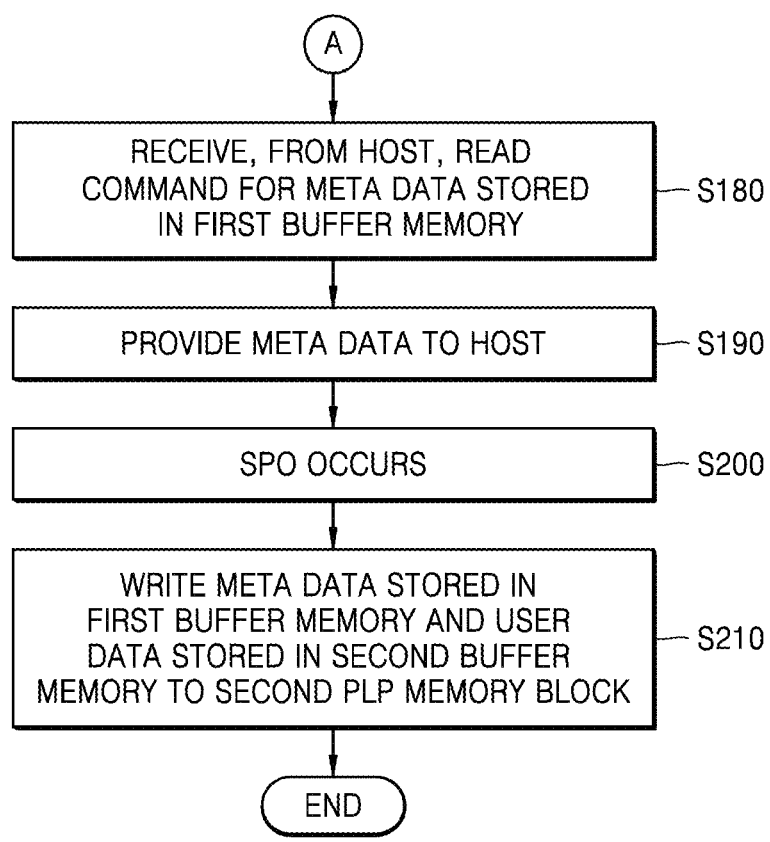
FIG. 9 is a flowchart of an operating method of a storage device in a case where a read command for meta data is received and sudden power-off (SPO) occurs.

FIG. 9 is a flowchart of an operating method of a storage device 200 in a case where a read command for meta data is received and SPO occurs.

The flowchart of FIG. 9 illustrates operations after operation S170 of FIG. 8. Referring to FIG. 8, the storage controller 210 may restore the meta data into the first buffer memory 250 in response to the first charging complete signal CL1, and is then switched to a state in which a command related to the meta data may be received from the host 100.

When the storage device 200 is a solid state drive (SSD), the storage device 200 may be a device complying with a nonvolatile memory express (NVMe) standard. The command related to the meta data received from the host may be an Admin command of the NVMe standard. For example, the Admin command may be a command for writing or reading meta data related to a system configuration.

Referring to FIG. 9, the storage controller 210 may receive a read command for meta data stored in the first buffer memory 250 from the host 100 (operation S180). The storage controller 210 may provide the meta data stored in the first buffer memory 250 to the host 100 in response to the read command (operation S190). Then, after SPO occurs (operation S200), the storage controller 210 may write the meta data stored in the first buffer memory 250 and user data stored in the second buffer memory 260 to a second PLP memory block 232 corresponding to a power cycle after SPO (operation S210). The meta data and user data stored in the second PLP memory block 232 may be restored into the buffer memory 240 when the power is applied again after SPO occurred.

Figure 10A:
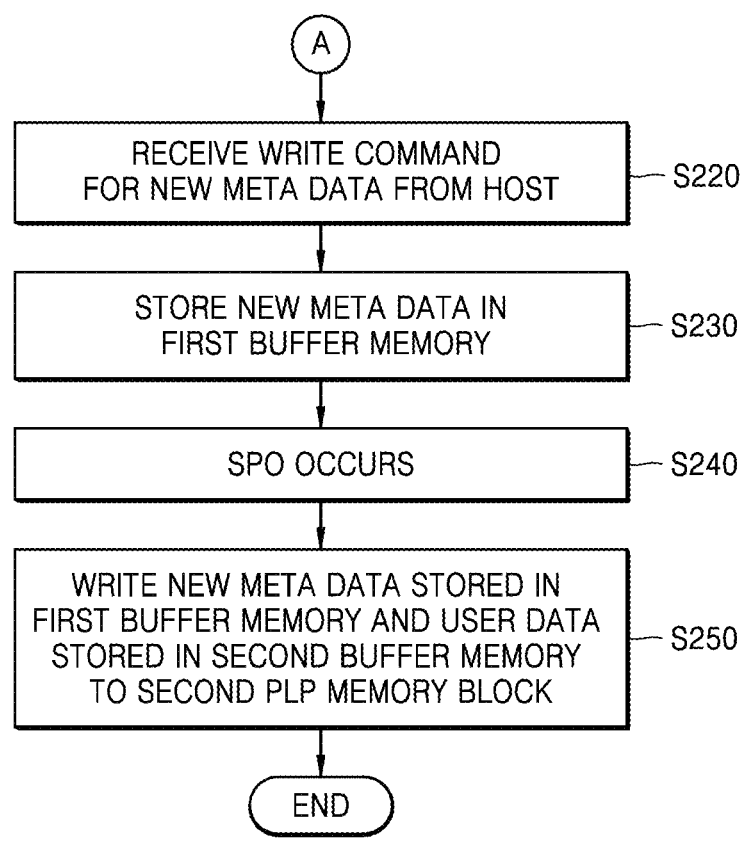
FIGS. 10A and 10B are a flowchart of an operating method of a storage device and a block diagram corresponding thereto, respectively, in a case where a write command for new meta data is received and SPO occurs.
Figure 10B:
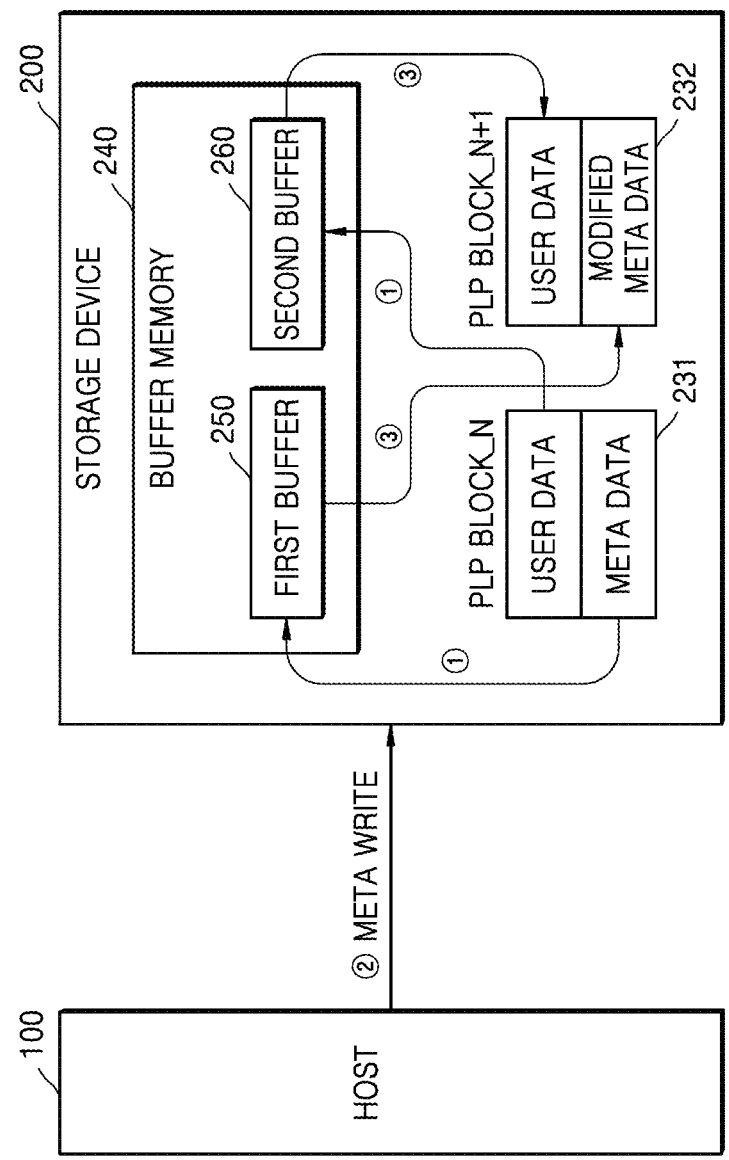

FIGS. 10A and 10B are a flowchart of an operating method of a storage device 200 and a block diagram corresponding thereto, respectively, in a case where a write command for new meta data is received and SPO occurs.

The flowchart of FIG. 10A illustrates operations after operation S170 of FIG. 8. Referring to FIG. 10A, a write command for new meta data may be received from the host 100 by the storage controller 210 (operation S220). The storage controller 210 may store the new meta data in the first buffer memory 250 in response to the write command (operation S230). Then, after SPO occurs (operation S240), the storage controller 210 may write the new meta data stored in the first buffer memory 250 and user data stored in the second buffer memory 260 to the second PLP memory block 232 corresponding to the power cycle after SPO (operation S250). The meta data and user data stored in the second PLP memory block 232 may be restored into the buffer memory when the power is applied again after SPO occurred.

This will be described in detail with reference to the block diagram of FIG. 10B. In response to the first charging complete signal CL1, the storage controller 210 may store the meta data stored in the first PLP memory block 231 in the first buffer memory 250 and may store the user data stored in the first PLP memory block 231 in the second buffer memory 260.

When a command META WRITE for writing new meta data is received from the host 100 by the storage controller 210, the storage controller 210 may store new meta data in the first buffer memory 250. Then, when SPO occurs, the new meta data stored in the first buffer memory 250 is prior to being written to the NVM 230, and thus a problem of data loss may occur.

Referring back to FIG. 5, the storage controller 210 may receive the first charging complete signal CL1 when capacitors included in a first region 221 of the charging circuit 220 are charged. In this case, electric power generated by charging the first region 221 may be electric power required, or sufficient, to write the meta data stored in the first buffer memory 250 to the second PLP memory block 232. Therefore, when SPO occurs, the new meta data stored in the first buffer memory 250 is written to the second PLP memory block 232 by the electric power generated by charging the first region 221, and thus may be protected.

Alternatively, referring to FIG. 6, the storage controller 210 may receive the first charging complete signal CL1 when the charging circuit 220 is charged with the electric power higher than the first power level over time. In this case, the first electric power level may be electric power required, or sufficient, to write the meta data stored in the first buffer memory 250 to the second PLP memory block 232. Therefore, when SPO occurs, the new meta data stored in the first buffer memory 250 is written to the second PLP memory block 232 by the electric power generated by being charged with the first level or higher, and thus may be protected.

That is, according to an example embodiment of the inventive concepts, when power is applied and before a user input/output (user I/O) is generated, the storage device 200 may program the NVM 230 by reflecting new meta data temporarily stored in the first buffer memory 250 and existing user data stored in the second buffer memory 260, thereby protecting data even when SPO occurs.

Figure 11A:
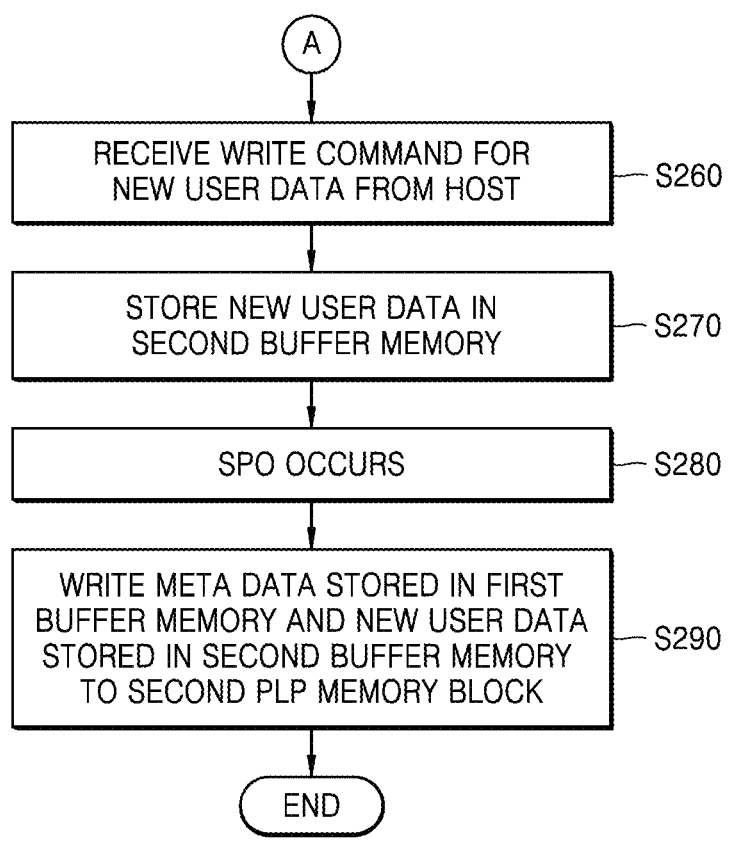
FIGS. 11A and 11B are a flowchart of an operating method of a storage device and a block diagram corresponding thereto, respectively, in a case where a write command for new user data is received and SPO occurs.
Figure 11B:
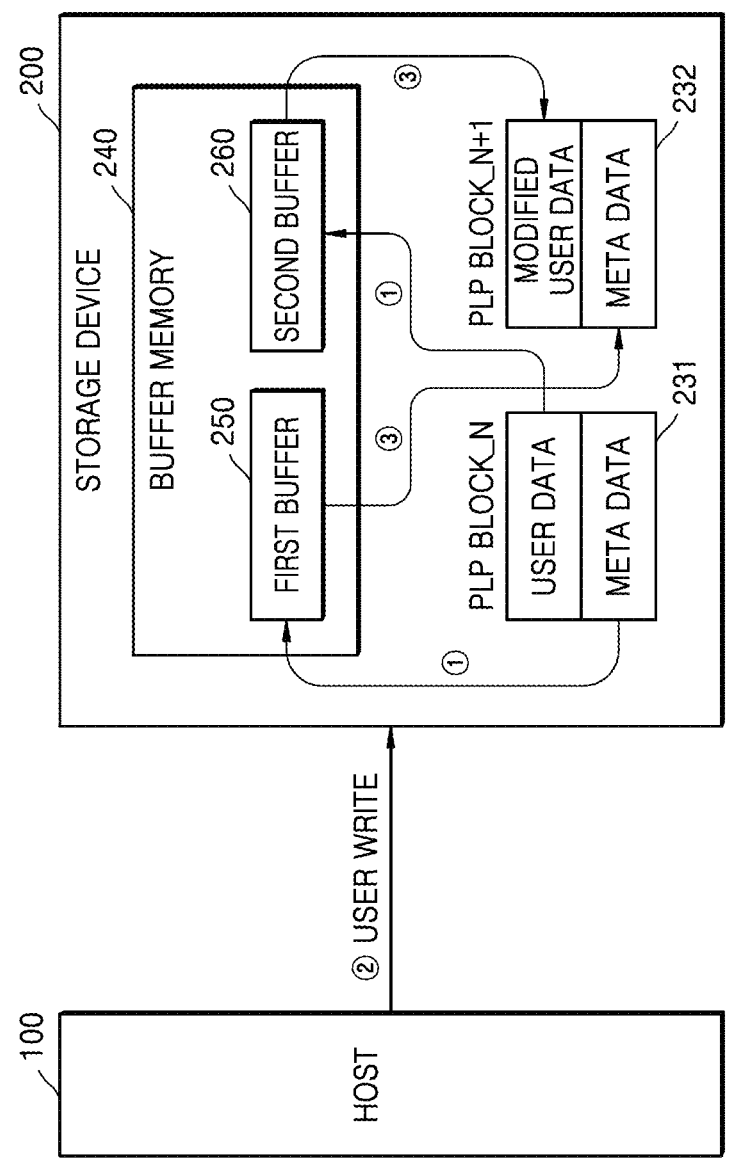

FIGS. 11A and 11B are a flowchart of an operating method of a storage device 200 and a block diagram corresponding thereto, respectively, in a case where a write command for new user data is received and SPO occurs.

The flowchart of FIG. 11A illustrates operations after operation S170 of FIG. 8. Referring to FIG. 8, the storage controller 210 may restore user data into the second buffer memory 260 in response to the second charging complete signal CL2, and is then switched to a state in which a command related to the user data may be received from the host.

When the storage device 200 is an SSD, the storage device 200 may be a device complying with the NVMe standard. The command related to the user data received from the host may be an NVM command of the NVMe standard. For example, the NVM command may be a command for writing or reading information related to the user data.

Referring to FIG. 11A, a write command for new user data may be received from the host by the storage controller 210 (operation S260). The storage controller 210 may store the new user data in the second buffer memory 260 in response to the write command (operation S270). Then, after SPO occurs (operation S280), the storage controller 210 may write meta data stored in the first buffer memory 250 and the new user data stored in the second buffer memory 260 to the second PLP memory block 232 corresponding to the power cycle after SPO (operation S290). The meta data and new user data stored in the second PLP memory block 232 may be restored into the buffer memory when the power is applied again after SPO occurred.

This will be described in detail with reference to the block diagram of FIG. 11B. In response to the first charging complete signal CL1, the storage controller 210 may store the meta data stored in the first PLP memory block 231 in the first buffer memory 250 and may store the user data stored in the first PLP memory block 231 in the second buffer memory 260.

When a command USER WRITE for writing new user data is received from the host 100 by the storage controller 210, the storage controller 210 may store new user data in the second buffer memory 260. Then, when SPO occurs, the new user data stored in the second buffer memory 260 is prior to being written to the NVM 230, and thus a problem of data loss may occur.

Referring back to FIG. 5, the storage controller 210 may receive the second charging complete signal CL2 when capacitors included in a first region 221 and a second region 222 of the charging circuit 220 are charged. In this case, electric power generated by charging the second region 222 may be electric power required, or sufficient, to write the user data stored in the second buffer memory 260 to the second PLP memory block 232. Therefore, when SPO occurs, the new user data stored in the second buffer memory 260 is written to the second PLP memory block 232 by the electric power generated by the second region 222, and thus may be protected.

Alternatively, referring to FIG. 6, the storage controller 210 may receive the second charging complete signal CL2 when the charging circuit 220 is charged with the second electric power level or higher over time. In this case, the second electric power level may be electric power required, or sufficient, to write the user data stored in the second buffer memory 260 to the second PLP memory block 232. Therefore, when SPO occurs, the new user data stored in the second buffer memory 260 is written to the second PLP memory block 232 by the electric power generated by being charged with the second level or higher, and thus may be protected.

That is, according to an example embodiment of the inventive concepts, after a user I/O is generated, the storage device 200 may program the NVM 230 by reflecting new meta data temporarily stored in the first buffer memory 250 and new user data stored in the second buffer memory 260, thereby ensuring, or increasing, data integrity even when SPO occurs.

Figure 12:
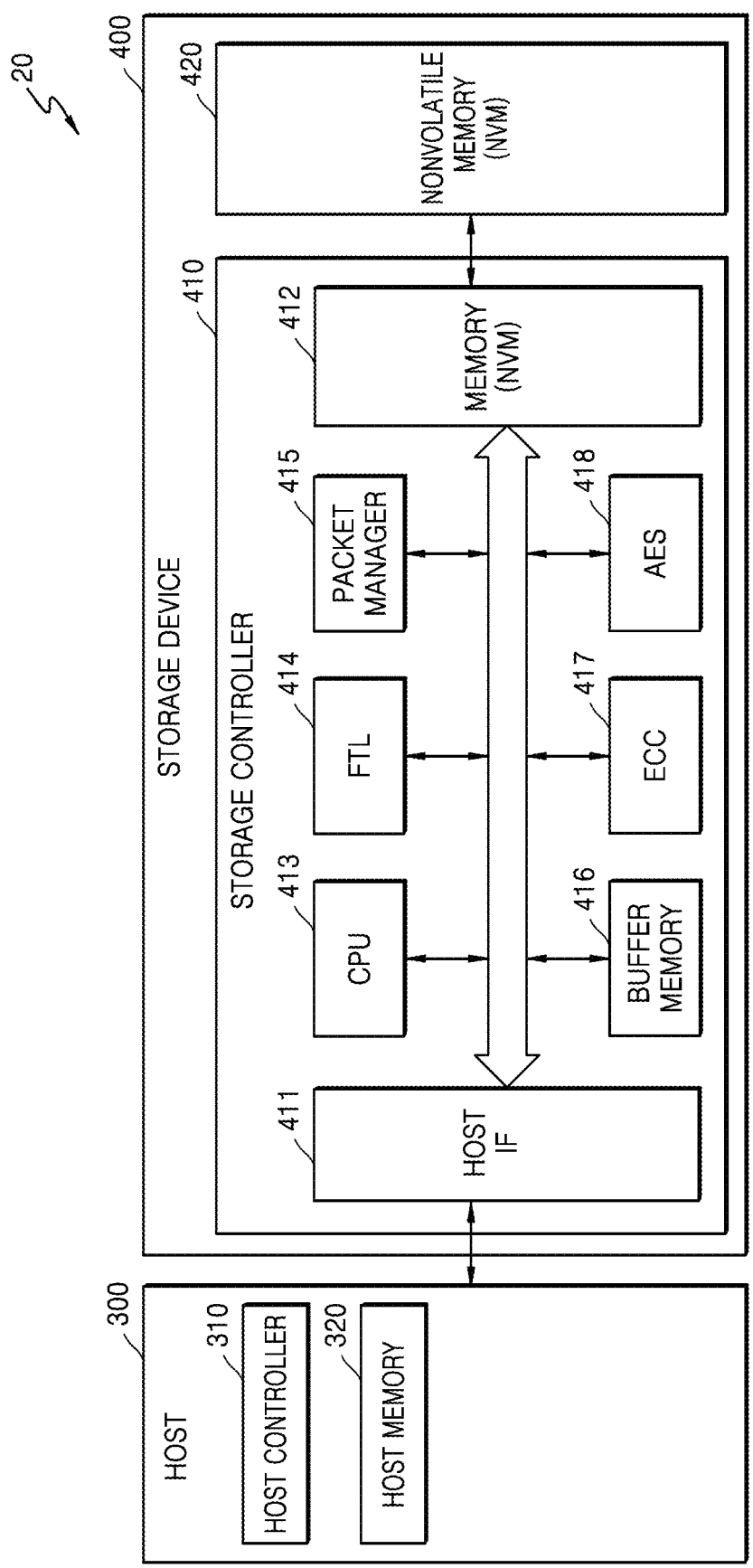
FIG. 12 is a block diagram of a host-storage system according to an example embodiment of the inventive concepts.

FIG. 12 is a block diagram of a host-storage system according to an example embodiment of the inventive concepts.

Referring to FIGS. 1 and 12, the storage system 10 of FIG. 1 may expand into a host-storage system 20 of FIG. 12. The host-storage system 20 may include a host 300 and/or a storage device 400. Also, the storage device 400 may include a storage controller 410 and/or an NVM 420. Also, according to an example embodiment of the inventive concepts, the host 300 may include a host controller 310 and/or a host memory 320. The host memory 320 may function as a buffer memory for temporarily storing data to be transmitted to the storage device 400 and/or data transmitted from the storage device 400.

The storage device 400 may include storage media for storing data according to a request from the host 300. As an example, the storage device 400 may include at least one of an SSD, an embedded memory, and/or a detachable external memory. When the storage device 400 is an SSD, the storage device 400 may be a device complying with the NVMe standard. When the storage device 400 is an embedded memory and/or an external device, the storage device 400 may be a device complying with the universal flash storage (UFS) and/or embedded multi-media card (eMMC) standard. Each, or one or more, of the host 300 and/or the storage device 400 may generate a packet according to an adopted standard protocol and transmit the packet.

When the NVM 420 of the storage device 200 includes flash memory, the flash memory may include a two-dimensional (2D) NAND memory array and/or a three-dimensional (3D) (or vertical) NAND (VNAND) memory array. As another example, the storage device 400 may include various other types of nonvolatile memories. For example, the storage device 200 may include MRAM, spin-transfer torque MRAM, conductive bridging RAM (CBRAM), ferroelectric RAM (FeRAM), PRAM, RRAM, and/or various other types of memories.

According to an example embodiment, the host controller 310 and the host memory 320 may be implemented as separate semiconductor chips. Alternatively, in some example embodiments, the host controller 310 and the host memory 320 may be integrated on the same semiconductor chip. As an example, the host controller 310 may be any one of a plurality of modules included in an application processor, and the application processor may be implemented as a system on chip (SoC). Also, the host memory 320 may be an embedded memory provided in the application processor, and/or an NVM or a memory module arranged outside the application processor.

The host controller 310 may manage an operation of storing data (e.g., write data) of a buffer memory 416 in the NVM 420 or storing data (e.g., read data) of the NVM 420 in the buffer memory 416.

The storage controller 410 may include a host interface 411, a memory interface 412, and/or a central processing unit (CPU) 413. Also, the storage controller 410 may further include a flash translation layer (FTL) 414, a packet manager 415, a buffer memory 416, an error correction code (ECC) engine 417, and/or an advanced encryption standard (AES) engine 418. The storage controller 410 may further include a working memory (not shown) in which the FTL 414 is loaded, and operations for writing and reading data to and from an NVM may be controlled as the CPU 413 executes the FTL 414.

The FTL 414 may perform various functions like address mapping, wear-leveling, and/or garbage collection. The address mapping operation is an operation for translating a logical address received from a host into a physical address used to actually store data in the NVM 420. The wear-leveling is a technique for reducing or preventing excessive degradation of a particular block by allowing blocks in the NVM 420 to be uniformly used and may be, for example, implemented through a firmware technology for balancing erase counts of physical blocks. The garbage collection is a technique for securing usable capacity in the NVM 420 by copying effective data of a block to a new block and then erasing the existing block.

The packet manager 415 may generate a packet according to a protocol of an interface agreed with the host 300 or may parse various information from packets received from the host 300. Also, the buffer memory 416 may temporarily store data to be written to the NVM 420 or data to be read from the NVM 420. The buffer memory 416 may be a component provided in the storage controller 410, but may also be provided outside the storage controller 410.

The ECC engine 417 may detect and correct an error on read data read from the NVM 420. In detail, the ECC engine 417 may generate parity bits regarding write data to be written to the NVM 420, and the parity bits generated as described above may be stored in the NVM 420 together with the write data. When data is read from the NVM 420, the ECC engine 417 may correct an error of read data by using parity bits read from the NVM 420 together with the read data and output error-corrected read data.

The AES engine 418 may perform at least one of an encryption operation and a decryption operation for data input to the storage controller 410 by using a symmetric-key algorithm.

One or more of the elements disclosed above may include or be implemented in one or more processors such as hardware including logic circuits; a hardware/software combination such as a processor executing software; or a combination thereof. For example, the processors more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:
1. A storage device comprising:
a nonvolatile memory comprising power loss protector (PLP) memory blocks configured to store at least one of meta data or user data for data backup;
a buffer memory configured to store at least one of the meta data or the user data stored in the PLP memory blocks;
a charging circuit configured to
generate electric power for data backup in response to a sudden power off (SPO) occurrence, and
generate a first charging complete signal or a second charging complete signal according to a level of the electric power; and
a processor configured to control at least one of the nonvolatile memory or the buffer memory to restore the meta data from the PLP memory blocks to the buffer memory in response to the first charging complete signal, and
restore the user data from the PLP memory blocks to the buffer memory in response to the second charging complete signal.

2. The storage device of claim 1, wherein the buffer memory comprises:
a first buffer memory configured to store the meta data; and
a second buffer memory configured to store the user data.

3. The storage device of claim 2, wherein the charging circuit comprises a first region,
wherein the first region is configured to generate electric power for writing the meta data stored in the first buffer memory to a PLP memory block corresponding to a power cycle after SPO, and
the charging circuit is configured to transmit the first charging complete signal to the processor in response to capacitors included in the first region becoming completely charged.

4. The storage device of claim 3, wherein the charging circuit further comprises a second region,
wherein the second region is configured to generate electric power for writing the user data stored in the second buffer memory in the PLP memory block corresponding to the power cycle after SPO, and
wherein the charging circuit is configured to transmit the second charging complete signal to the processor in response to capacitors included in the second region becoming completely charged.

5. The storage device of claim 2, wherein the charging circuit is configured to:
transmit the first charging complete signal to the processor in response to the electric power generated by the charging circuit being at a first level or higher; and
transmit the second charging complete signal to the processor in response to the electric power generated by the charging circuit being at a second level or higher, the second level being higher than the first level.

6. The storage device of claim 2, wherein the first buffer memory and the second buffer memory are configured to be allocated in one buffer memory.

7. The storage device of claim 2, wherein the first buffer memory and the second buffer memory are configured to be allocated to a plurality of different buffer memories.

8. The storage device of claim 1, wherein the processor comprises a plurality of cores, and
the nonvolatile memory comprises the PLP memory blocks for each core.

9. An operating method of a storage device, wherein the storage device comprises a nonvolatile memory comprising a first power loss protector (PLP) memory block corresponding to an Nth power cycle and a second PLP memory block corresponding to a (N+1)th power cycle, the operating method comprising:
when power is applied to the storage device, reading meta data from the first PLP memory block in response to a first charging complete signal;
storing the meta data in a first buffer memory of the storage device;
reading user data from the first PLP memory block in response to a second charging complete signal; and
storing the user data in a second buffer memory of the storage device,
wherein N is an integer greater than or equal to 0.

10. The operating method of claim 9, wherein the storage device further comprises a charging circuit configured to generate electric power for data backup, and
the operating method further comprises:
generating the first charging complete signal in response to electric power generated by the charging circuit being at a first level or higher; and
generating the second charging complete signal in response to the electric power generated by the charging circuit being at a second level or higher, the second level being higher than the first level.

11. The operating method of claim 9, further comprising:
receiving, from a host, a read command for the meta data stored in the first buffer memory; and
providing the meta data to the host in response to the read command.

12. The operating method of claim 9, further comprising:
writing the meta data stored in the first buffer memory and the user data stored in the second buffer memory to the second PLP memory block in response to a sudden power off (SPO) occurrence.

13. The operating method of claim 9, further comprising:
receiving a write command for new meta data from a host; and
storing the new meta data in the first buffer memory in response to the write command.

14. The operating method of claim 13, further comprising:
writing the new meta data stored in the first buffer memory and the user data stored in the second buffer memory to the second PLP memory block in response to a sudden power off (SPO) occurrence.

15. The operating method of claim 9, further comprising:
receiving a write command for new user data from a host;
storing the new user data in the second buffer memory in response to the write command; and
writing the meta data stored in the first buffer memory and the new user data stored in the second buffer memory to the second PLP memory block in response to a sudden power off (SPO) occurrence.

16. An operating method of a storage device, wherein the storage device comprises a nonvolatile memory comprising a first power loss protector (PLP) memory block corresponding to an Nth power cycle and a second PLP memory block corresponding to a (N+1)th power cycle,
the operating method comprising:
storing meta data stored in the first PLP memory block in a first buffer memory of the storage device in response to power being applied to the storage device;
storing user data stored in the first PLP memory block in a second buffer memory of the storage device in response to power being applied to the storage device; and
writing the meta data and the user data to the second PLP memory block in response to a sudden power off (SPO) occurrence,
wherein N is an integer greater than or equal to 0.

17. The operating method of claim 16, further comprising:
receiving a write command for new meta data from a host before the SPO occurrence;
storing the new meta data in the first buffer memory in response to the write command before the SPO occurrence; and
writing the new meta data and the user data to the second PLP memory block in response to the SPO occurrence.

18. The operating method of claim 16, further comprising:
receiving a write command for new user data from a host before the SPO occurrence;

storing the new user data in the second buffer memory in response to the write command before the SPO occurrence; and writing the meta data and the new user data to the second PLP memory block in response to the SPO occurrence.

19. The operating method of claim 16, wherein the first buffer memory and the second buffer memory of the storage device are configured to be allocated to a plurality of different buffer memories.

20. The operating method of claim 16, wherein the storage device comprises a multi-core processor comprising a plurality of cores, and the nonvolatile memory comprises the first PLP memory block and the second PLP memory block for each core.

* * * * *